United States Patent
Schwartz et al.

(10) Patent No.: US 6,531,179 B2
(45) Date of Patent: Mar. 11, 2003

(54) USE OF AQUEOUS POLYMER DISPERSIONS FOR MODIFYING MINERAL COATINGS FOR CONCRETE MOLDINGS

(75) Inventors: Manfred Schwartz, Frankenthal (DE); Bertold Bechert, Grünstadt (DE); Hans-Jürgen Denu, Friedelsheim (DE); Eckehardt Wistuba, Bad Dürkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 64 days.

(21) Appl. No.: 09/748,285

(22) Filed: Dec. 27, 2000

(65) Prior Publication Data

US 2001/0007711 A1 Jul. 12, 2001

(30) Foreign Application Priority Data

Jan. 7, 2000 (DE) .......................................... 100 00 367

(51) Int. Cl.$^7$ ............................. B05D 1/02; B05D 3/02
(52) U.S. Cl. .................... 427/136; 427/393.6; 427/421; 427/358; 427/359
(58) Field of Search .............................. 427/393.6, 136, 427/421, 358, 359

(56) References Cited

U.S. PATENT DOCUMENTS 5,718,943 A * 2/1998 Hsu et al. ................... 427/136

FOREIGN PATENT DOCUMENTS

| DE | 39 32 573 | | 4/1991 |
| EP | 931777 | * | 7/1999 |
| GB | 2 030 890 | | 4/1980 |
| PL | 89030 | * | 10/1976 |

* cited by examiner

*Primary Examiner*—Erma Cameron
(74) *Attorney, Agent, or Firm*—Oblon, Spivak, McClelland, Maier & Neustadt, P.C.

(57) ABSTRACT

The invention describes a method of coating a concrete molding which comprises a) the application of at least one plastic, cement-bound mineral composition to an uncoated mineral molding wherein said plastic composition comprises at least one aqueous polymer dispersion and b) bringing about the setting of the plastic composition, wherein the aqueous polymer dispersion comprises: at least one polymer P in the form of dispersed polymer particles with a glass transition temperature of from −20 to +80° C., the polymer containing not more than 2% by weight of copolymerized monoethylenically unsaturated monomers having an acid group.

16 Claims, No Drawings

USE OF AQUEOUS POLYMER DISPERSIONS FOR MODIFYING MINERAL COATINGS FOR CONCRETE MOLDINGS

The present invention relates to a method of coating concrete moldings with a plastic mineral coating composition which is modified with polymer dispersions having a glass transition temperature of from −20 to +80° C., in which the polymer has been built up from ethylenically unsaturated monomers.

Concrete moldings are moldings or construction components made from concrete and obtainable by molding a flowable concrete mixture and then bringing about setting of the molded mixture. Examples of concrete moldings are concrete pipes, e.g. those for waste water, kerbstones, floor slabs, base slabs, stair treads, walling components and concrete roof tiles.

Concrete roof tiles are concrete moldings in the shape of roof tiles, and in recent times have been increasingly preferred over the clay roof tiles used hitherto for covering roofs.

Concrete moldings, in particular concrete roof tiles, are generally produced by extrusion processes from plastic concrete compositions which have not yet set. For coloring, these concrete compositions generally comprise an inorganic color pigment, such as iron oxide red pigments or iron-oxide black pigments. The advantage of concrete roof tiles over conventional clay roof tiles is their much lower production cost and their relatively high mechanical strength, for example that shown in adverse weather conditions, e.g. in hail showers. However, a disadvantage of concrete moldings, in particular concrete roof tiles, is that on weathering some of the calcium present in these migrates to the surface, where it causes unsightly efflorescence. In addition, concrete moldings have a rough surface as a result of their method of production, and this promotes erosion and in particular facilitates infestation with plant life, such as algae, lichens or mosses.

While in recent times the problem of weathering-related efflorescence has been substantially solved by treating the surface with coating materials based on aqueous polymer dispersions, there are no cost-effective solutions to the problem of producing concrete moldings, in particular concrete roof tiles, with smooth surfaces.

GB-A 2,030,890 has proposed providing extruded concrete roof tiles with a cement-bonded mineral coating in which the substantive materials present are cement, water and pigments. The coating is generally applied, by extrusion or roller-application, to the freshly extruded and as yet unset green concrete roof tile. The coatings give a smoother surface on the concrete roof tile. However, a disadvantage of the coatings is that they flake readily. In addition, their high cement content makes them uneconomic. While the criterion of economy can be met by adding very fine sands to the mineral coating material, the problem of flaking remains.

DE-A 3932573 describes concrete roof tiles provided with a mineral coating which comprises a cement-compatible polymer, besides cement as binder, very fine sand as aggregate and inorganic pigments. Concrete roof tiles thus coated are substantially free from pores and have better chemical and physical resistance to the effects of weathering.

However, the aqueous polymer dispersions usually used for modifying cement-bound mineral compositions retard the setting of the mineral compositions. This produces problems in their subsequent use. For example, even after a period of 24 h, for example, the strength of the coating is only modest, and it is therefore very easily damaged during the packaging of the concrete moldings or during their shipping.

In the case of concrete roof tiles, retarded setting causes problems during subsequent coating of the roof tiles with water-based paints. The problem of flaking of the mineral coating on exposure to frost/thaw cycles is moreover not satisfactorily solved by the polymeric additives generally used.

It is an object of the present invention to provide an aqueous polymer dispersion which gives mineral coatings which do not flake and which at the same time do not impair the process of setting of the mineral composition.

We have found that this object is achieved, surprisingly, by eans of aqueous polymer dispersions based on styrene-acrylate polymers, styrene-butadiene polymers or straight acrylate polymers, if these comprise not more than 2% by weight of copolymerized monomers bearing acid groups and, to stabilize the polymer particles in the dispersion, comprise an emulsifier system which embraces a mixture made from a salt selected among sulfuric half-esters of ethoxylated alcohols having at least one $C_4$–$C_{20}$-alkyl group and neutral compounds b selected among ethoxylated alcohols having a $C_4$–$C_{20}$-alkyl group.

The present invention therefore provides a method of coating a concrete molding which comprises:
a) the application of at least one plastic, cement-bound mineral composition to an uncoated concrete molding, wherein said plastic composition comprises very fine sand, cement, at least one aqueous polymer dispersion and water in amounts ensuring that said plastic composition has plastic deformability, and
b) bringing about the setting of the plastic composition; wherein the aqueous polymer dispersion is selected from
A at least one polymer P in the form of dispersed polymer particles with a glass transition temperature within the range from −20 to +80° C., the polymer having been built up from ethylenically unsaturated monomers M, embracing:
  i) from 90 to 99.9% by weight of at least one hydrophobic, monoethylenically unsaturated monomer M1, selected among styrene, butadiene, the $C_1$–$C_4$-alkyl esters of methacrylic acid and the $C_2$–$C_{12}$-alkyl esters of acrylic acid, and
  ii) from 0.1 to 10% by weight of at least one hydrophilic, monoethylenically unsaturated monomer M2 embracing up to 2% by weight, based on the total amount of monomer, of one or more monoethylenically unsaturated monomers having at least one acid group (monomers M2a), and/or embracing up to 10% by weight of other hydrophilic monomers M2b, and
B at least one emulsifier system for stabilizing the polymer particles and comprising:
  a) at least one salt of a sulfuric half-ester of an alkoxylated alcohol which has at least one $C_4$–$C_{20}$-alkyl chain (salt a), and
  b) at least one alkoxylated alcohol which has at least one $C_4$–$C_{20}$-alkyl chain (neutral compound b).

The present invention also provides a process for producing concrete roof tiles with a mineral coating, and also the concrete roof tiles obtainable by this process.

All data in % by weight are based on 100% by weight, i.e. on the entire amount of monomers.

For the purposes of the present invention, the general term concrete roof tiles includes, of course, pantiles and verge tiles, ridge tiles, step tiles, ventilation tiles and other concrete roofing components used in the covering of roofs.

According to the invention, the emulsifier system used to stabilize the particles of the polymer P comprises at least one anionic emulsifier (salt a) which has a sulfated oligoalkylene oxide unit as hydrophilic structural element and has a $C_4$–$C_{20}$-alkyl chain as hydrophobic structural element. Examples of salts a are the salts of sulfuric half-esters of alkoxylated alkylphenols having a $C_4$–$C_{20}$-alkyl chain, preferably a $C_6$–$C_{16}$-alkyl chain and in particular a $C_8$–$C_{12}$-alkyl chain, and also the salts of sulfuric half-esters of alkoxylated alkanols, preferably those derived from linear or branched $C_8$–$C_{16}$-alkanols. The last-mentioned class of emulsifiers is preferred according to the invention. The alcohol component in this last-mentioned class of emulsifiers generally derives from little-branched fatty alcohols obtainable, for example, by reducing naturally occurring fatty acids, or from oxo alcohols obtainable by oxo synthesis and generally having a somewhat greater degree of branching, or from primary, linear Ziegler alcohols. It is, of course, also possible to use mixtures of the salts a with different alcohol components. Particularly preferred alcohol component in emulsifiers of this type is lauryl alcohol.

Among the salts a, particular preference is given to the alkali metal salts and the calcium salts, and particularly to the sodium salts.

The alkylene oxide units in the salts a generally derive from $C_2$–$C_4$ alkylene oxides, such as propylene oxide, butylene oxide, or preferably ethylene oxide. The average degree of alkoxylation in the salts a is generally from 1 to 50, preferably from 2 to 40. The average degree of alkoxylation is frequently $\geq 10$, $\geq 15$ or $\geq 20$, in particular for emulsifiers derived from alkylphenols. In other embodiments, the degree of alkoxylation is below 20, e.g. from 2 to 8, in particular in the case of anionic emulsifiers derived from alkanols. A preferred embodiment of the present invention therefore provides the use of those polymer dispersions in which the salt a has been selected among the sodium salts of sulfuric half-esters of ethoxylated $C_8$–$C_{16}$-alkanols with an average degree of ethoxylation of from 1 to 20, in particular from 2 to 8.

Very particularly preferred salt a is the sodium salt of the sulfuric half-ester of ethoxylated lauryl alcohol, in particular with an average degree of ethoxylation of from 2 to 8, very particularly preferably of 3. Other preferred salts are the sodium salt of the sulfuric half-ester of ethoxylated octylphenol, isooctylphenol or nonylphenol, with a degree of ethoxylation >10, preferably from 20 to 50.

Examples of neutral compounds b suitable according to the invention are alkoxylated, preferably ethoxylated, alkylphenols having a $C_4$–$C_{20}$-alkyl chain, and alkoxylated, preferably ethoxylated, $C_8$–$C_{20}$, in particular $C_8$–$C_{16}$, alkanols. The latter class of emulsifiers is preferred as neutral compound b. The alcohol component in the last-mentioned class of emulsifiers preferably derives from the abovementioned naturally occurring or synthetic alcohols, in particular from synthetic branched alcohols or from a mixture of these, isotridecanol being particularly preferred among these. The average degree of alkoxylation is generally from 5 to 100, and preferably from 5 to 60.

In preferred embodiments of the present invention, use is made of an ethoxylated $C_8$–$C_{16}$ alkanol which preferably derives from a branched alkanol, in particular from isotridecanol, and which has an average degree of ethoxylation of from 5 to 40, in particular of from 5 to 10 and very particularly of about 8. In other preferred embodiments, use is made of an ethoxylated alkylphenol, such as n-octylphenol, isooctylphenol or nonylphenol, which has an average degree of ethoxylation >10, in particular from 20 to 60.

The emulsifier system used according to the invention may also comprise a subordinate amount of other emulsifiers. Use may be made here in particular of emulsifiers having oligoalkylene oxide structural units, e.g. polyethylene oxides and polypropylene oxides, and also polyethylene/polypropylene oxides. Other anionic emulsifiers which may be used are the alkali metal or calcium salts of alkyl sulfates (alkyl: $C_8$–$C_{22}$), of alkylsulfonic acids (alkyl: $C_{12}$–$C_{18}$) or of alkylarylsulfonic acids (alkyl: $C_9$–$C_{18}$). The proportion of additional emulsifiers is usually below 50% by weight, in particular below 20% by weight. It is very particularly preferable for the emulsifier system used according to the invention to comprise no other emulsifiers.

The polymer dispersions used according to the invention generally comprise, based on the polymer present therein, from 0.1 to 5% by weight, in particular from 0.5 to 4% by weight, particularly preferably from 0.5 to 2.5% by weight, of at least one anionic emulsifier, and from 0.5 to 5% by weight, in particular from 1 to 4% by weight, particularly preferably from 0.5 to 2.5% by weight, of at least one neutral compound b. In the emulsifier systems used, the ratio by weight of salt a to neutral compound b is generally from 1:2 to 5:1 and in particular from 1:1.5 to 3:1. The total amount of emulsifiers preferably does not exceed 10% by weight, in particular does not exceed 8% by weight and particularly preferably does not exceed 5% by weight, and is preferably at least 1% by weight.

Besides the abovementioned emulsifiers, the aqueous polymer dispersions used may also comprise a salt of a formaldehyde condensation product of an aromatic sulfonic acid, for example of naphthalenesulfonic acid or of phenolsulfonic acid, in order to stabilize the polymer particles. The condensation product generally has a number-average molecular weight $M_n$<1500 and a weight-average molecular weight of from 5 000 to 10000, in particular from 700 to 2500. Among these, preference is given to the alkali metal and alkaline earth metal salts, in particular the sodium and calcium salts. By way of example, suitable salts of formaldehyde condensation products of aromatic sulfonic acids are described in DE-A 24 45 813, EP-A 78449, EP-A 407 889, WO 98/03576 and WO 98/03577, which are incorporated herein by way of reference in this respect. Compounds of this type are available commercially as Tamol® grades from BASF AG (e.g. Tamol® NN 4501 and Tamol® NN 9104). The amount of compounds of this type used is generally from about 0.1 to 2.0% by weight, based on the polymer present in the aqueous dispersion.

According to the invention, it is preferable for no water-soluble polymers with a number-average molecular weight $M_n$>1500 to be present in the aqueous polymer dispersions used. Polymers of this type are usually used as protective colloids to stabilize the polymer particles in aqueous polymer dispersions. Particular success has been shown to be obtained when no water-soluble polymers having carboxyl groups are present in the polymer dispersions of the invention, e.g. water-soluble homo- or copolymers of acrylic acid or of methacrylic acid.

The polymer present in the aqueous polymer dispersions used according to the invention has generally been selected among the following classes of polymers:

i) styrene/butadiene copolymers,
ii) styrene/$C_2$–$C_{12}$-alkyl acrylate copolymers, and
iii) $C_1$–$C_4$-alkyl methacrylat/$C_2$–$C_{12}$-alkyl acrylate copolymers (known as straight acrylates).

The polymers P of the abovementioned classes of polymers also contain, in addition to the abovementioned monomers M1, from 0.1 to 10% by weight, based on the total weight of the polymer P, of at least one copolymerized hydrophilic monomer M2, which generally has a solubility >60 g/l in water at 25° C.

Examples of these monomers M2 are firstly the monomers M2a, selected among monoethylenically unsaturated monocarboxylic acids, preferably having from 3 to 6 carbon atoms, e.g. acrylic acid and methacrylic acid, monoethylenically unsaturated dicarboxylic acids preferably having from 4 to 8 carbon atoms, e.g. itaconic acid and methylenemaleic acid, and also ethylenically unsaturated sulfonic acids, such as vinyl-, allyl- and methallylsulfonic acid, and also acryloxyethanesulfonic acid, methacryloxyethanesulfonic acid, 2-acrylamido-2-methylpropanesulfonic acid, and 2-methacrylamido-2-methylpropanesulfonic acid, which may also be in the salt form within the polymers, e.g. as alkali metal salts. Preferred monomers M2a are acrylic acid, methacrylic acid and itaconic acid. The polymers of the aqueous polymer dispersions of the invention frequently contain from 0.1 to 2% by weight, and in particular from 0.1 to 1% by weight, of copolymerized monomers M2a, based on the total weight of the polymer. It has proven particularly useful for the polymer to contain not more than 1% by weight, in particular not more than 0.75% by weight, particularly preferably not more than 0.5% by weight, of copolymerized monomers M2a.

Alongside, or instead of, the monomers M2a, the polymers may also contain copolymerized monomers M2b selected among the amides and the N-methylolamides of monoethylenically unsaturated monocarboxylic acids preferably having from 3 to 6 carbon atoms, e.g. acrylamide, methacrylamide, N-methylolacrylamide and -methacrylamide, or among monoethylenically unsaturated nitriles having from 3 to 6 carbon atoms, such as acrylonitrile or methacrylonitrile. Their proportion may be up to 10% by weight, preferably from 0.1 to 5% by weight.

In respect of the abovementioned classes of polymers i to iii, polymer dispersions preferred according to the invention are those in which the monomers M1 include styrene and butadiene. The ratio by weight here of styrene to butadiene is preferably from 3:1 to 3:2. The auxiliary monomers M2 present in this class of polymers are preferably from 0.1 to 5% by weight of monomers M2b. Besides the monomers M2b, the polymers of this class of polymers may also contain copolymerized monomers M2a, but preferably not more than 1% by weight, based on the total amount of monomers.

In respect of the classes of polymers ii and iii, preferred polymers are those which contain at least one copolymerized monomer M1a selected among styrene and methyl methacrylate, and contain at least one copolymerized monomer M1b selected among $C_2$–$C_{10}$-alkyl acrylates, in particular selected among ethyl acrylate, n-butyl acrylate and 2-ethylhexyl acrylate. The weight ratio M1a:M1b here is preferably from 2:1 to 1:2 and in particular from 1.5:1 to 1:1. The classes of polymers ii and iii preferably contain an amount of from 0.05 to 2% by weight, in particular from 0.1 to 1% by weight, based on the polymer P, of monomers M2a as auxiliary monomers M2. Preferred monomers M2a here are from 0.1 to 1% by weight, in particular from 0.1 to 0.5% by weight, of acrylic acid or methacrylic acid. Polymers of this type also frequently contain from 0.1 to 5% by weight, in particular from 0.5 to 3% by weight, of monomers M2b, and among these preferably the amides of monoethylenically unsaturated $C_3$–$C_6$ monocarboxylic acids.

For the purposes of the present invention, the glass transition temperature $T_G$ is the midpoint temperature determined according to ASTM D3418-82 by differential thermal analysis (DSC) (see also Zosel, Farbe und Lack 82 (1976), pp. 125–134, and also DIN 53765). The glass transition temperature of the polymers is preferably from −10 to +50° C., in particular from 0 to 40° C.

The preparation of the aqueous polymer dispersions used according to the invention is known to the skilled worker and generally takes place by free-radical, aqueous emulsion polymerization of the monomers M in the presence of the abovementioned emulsifier system, and in the presence of an initiator which initiates free-radical polymerization and is preferably water-soluble.

Initiators which may be used are azo compounds, organic or inorganic peroxides, salts of peroxodisulfuric acid and redox initiator systems. It is preferable to use a salt of peroxodisulfuric acid, in particular a sodium, potassium or ammonium salt, or a redox initiator system in which the oxidant present is hydrogen peroxide or an organic peroxide, such as tert-butyl hydroperoxide, and in which the reducing agent present is a sulfur compound, in particular one selected among sodium hydrogensulfite, sodium hydroxymethanesulfinate and the bis(hydrogen)sulfite adduct of acetone.

The molecular weight of the polymers may, of course, be adjusted by adding a small amount of regulators, generally up to 2% by weight, based on the monomers M being polymerized. Particular regulators which may be used are organic thio compounds, and also allyl alcohols and aldehydes. In preparing the butadiene-containing polymers of class i, use is frequently made of from 0.1 to 2% by weight of regulators, preferably organic thio compounds, such as tert-dodecylmercaptan.

The emulsion polymerization may take place either continuously or else batchwise, preferably by a semicontinuous process. The monomers to be polymerized here may be fed to the polymerization mixture continuously, where the term continuously also covers step or gradient methods of operation. The monomers may be fed to the polymerization either as a monomer mixture or as an aqueous monomer emulsion.

An alternative to the seed-free preparation procedure if the polymer particles are to be given a specified size is emulsion polymerization by the seed-latex process or in the presence of in-situ-prepared seed latex. Processes for this are known and may be found in the prior art (see EP-B 40419, and also Encyclopedia of Polymer Science and Technology, Vol. 5, John Wiley & Sons Inc., New York 1966, p. 847).

The polymerization pressure and polymerization temperature are relatively unimportant. Operations are usually carried out at between room temperature and 120° C, preferably at from 40 to 110° C. and particularly preferably at from 50 to 100° C. The polymerization is generally carried out under pressure if butadiene-containing monomer mixtures are being polymerized.

Following the actual polymerization reaction it may, where appropriate, be necessary to render the aqueous polymer dispersions of the invention substantially free from odoriferous substances, such as residual monomers and other volatile organic constituents. This can be done physically using removal by distillation in a manner known per se (in particular via steam distillation) or by stripping with an inert gas. The level of residual monomers may also be lowered chemically by free-radical postpolymerization, in particular with exposure to redox initiator systems, as listed in DE-A 44 35 423, DE-A 44 19 518, and also DE-A 44 35 422, for example. It is preferable for the postpolymerization to be carried out using a redox initiator system made from at least one organic peroxide and from an organic sulfite.

After completion of the polymerization, the polymer dispersions used are frequently rendered alkaline prior to their use according to the invention, preferably to a pH of from 7 to 10. It has proven advantageous here to avoid the use of ammonia or any volatile organic amine for neutralization, so that the dispersion obtained is free from ammonia. The neutralization is preferably carried out using a hydroxide, such as sodium hydroxide or calcium hydroxide.

According to the invention, the aqueous polymer dispersions described above are used for modifying cement-bound mineral coatings. The mineral coatings are produced by applying, to the substrate to be coated, a plastic, cement-containing mineral coating composition which comprises, besides the usual constituents required, at least one aqueous polymer dispersion of the invention.

As stated at the outset, conventional cement-bound mineral coating compositions comprise at least one cement-containing hydraulic binder, mineral aggregates, and, where appropriate, coloring pigments, conventional auxiliaries, and also water, in amounts which together with the water from the aqueous polymer dispersion ensure ideal setting of the mineral composition and a favorable rheology for the user, i.e. plastic deformability matched to the respective coating process.

Typical hydraulic binders are composed of at least 70% by weight of cement, such as blast furnace slag cement, shale cement, Portland cement, hydrophobicized Portland cement, quick-setting cement, high-expansion cement or high-alumina cement, particularly preferably Portland cement.

Typical mineral aggregates are sand, in particular very fine sand, preferably with particle sizes up to 2 mm, and also inorganic fillers such as calcium carbonate and calcium silicates. Particular auxiliaries which may be used are antifoams and thickeners.

The ratio of water to cement in the mineral coating compositions modified according to the invention is generally from 0.3 to 0.7, in particular from 0.35 to 0.6.

According to the invention, preference is given to those plastic mineral compositions in which the ratio by weight of polymer (i.e. polymer of the aqueous polymer dispersion) to cement is from 1:100 to 7:3, in particular from 1:30 to 1:5 and very particularly preferably about 1:20.

Particular aggregates which may be used for mineral coating compositions particularly suitable for the coating of concrete roof tiles are very fine sands with particle sizes up to 2 mm, preferably up to 1 mm and in particular up to 0.8 mm, and also inorganic color pigments, in particular iron oxide red pigment and iron oxide black pigment.

Typical auxiliaries in compositions of this type are antifoams, solvents and/or plasticizers, water-retention aids, pigment dispersers or wetting agents, thickeners and biocides.

The mineral compositions suitable for coating concrete moldings, in particular for coating concrete roof tiles, very particularly preferably comprise, based on their dry constituents:
from 30 to 60% by weight, in particular from 45 to 50% by weight, of cement, in particular Portland cement,
from 35 to 60% by weight, in particular from 45 to 50% by weight, of very fine sand,
from 2 to 10% by weight, in particular from 3 to 6% by weight, of pigments, and
from 0 to 3% by weight of auxiliaries.

To use the compositions of the invention, water is added, preferably in amounts of from 15 to 30% by weight, based on the total weight of the composition.

The modified mineral coating compositions of the invention are particularly suitable for producing mineral coatings on concrete roof tiles. The present invention therefore also provides a process for producing a concrete roof tile with a mineral coating, embracing at least the following steps:
1. producing an uncoated green concrete roof tile,
2. applying a plastic, cement-containing mineral composition onto the green concrete roof tile while the tile is still moist, where the plastic mineral composition is one of the cement-bound mineral compositions defined above, modified with an aqueous polymer dispersion of the invention, and
3. drying the concrete roof tile.

The concrete moldings and especially the green concrete roof tiles are produced in a conventional manner from ready-mixed concrete, for example by extrusion. A process of this type is described by way of example in DE-A 3712700. In this process, a band of wet concrete is applied from wet-concrete-feed equipment to a supply of lower molds, compacted by a molding roll and a smoother, and its upper and lower margins are then cut by a cutting tool in a cutting unit, to give green roof tiles of identical length.

The wet concrete used preferably comprises, besides cement, Portland cement, conventional aggregates, such as sand, fly ash and color pigments, and also, where appropriate, conventional workability aids, as mentioned above and, where appropriate, modifying polymers, e.g. the aqueous polymer dispersions of the invention, and water in order to achieve sufficient plasticity to make the wet concrete usable.

If desired, an aqueous polymer dispersion, preferably an aqueous polymer dispersion of the invention, is added to the concrete mixtures used for producing mineral moldings, especially green concrete roof tiles, the amount added being such that the ratio by weight of polymer to cement in the concrete mixture is from 1:50 to 1:2, in particular from 1:20 to 1:5 and specifically about 1:10.

The use of the aqueous polymer dispersions of the invention in the concrete mixtures used for producing the mineral moldings and especially green concrete roof tiles gives concrete roof tiles with increased compressive strength and flexural tensile strength without any adverse effect on setting performance. In particular, a high level of initial strength is rapidly achieved, comparable with that from an unmodified green concrete roof tile.

The polymer-modified, cement-bound mineral coating composition of the invention is then applied to the band of wet concrete produced in this way, or to the fresh, mineral moldings especially to the fresh, green concrete roof tiles obtainable from the cutting process. It is applied by known processes, for example by roller-application or preferably by extrusion onto the plastic mineral composition. Following this, the resultant coated band of wet concrete or the resultant coated green concrete roof tile is subjected to a second cutting step and then passed onto a setting process. The setting may take place at room temperature or else via a hot-setting process at from 20 to 60° C., preferably at atmospheric humidity. The polymer-modified, cement-bound mineral coating composition of the invention may also be applied in the manner described above to a mineral molding or green concrete roof tile which has already set. However, it is preferable for this coating composition to be applied to a green concrete roof tile which has not yet set, or to a band of wet concrete. It is, of course, also possible to apply two or more mineral coatings to the green concrete roof tile.

This method gives a concrete molding and especially a concrete roof tile provided with at least one cement-bound mineral coating of the invention.

The amount of the cement-bound mineral coating composition of the invention generally applied is such as to give the resultant mineral coating a thickness of from 0.5 to 15 mm. In one preferred embodiment of the invention, the amount selected for application is such as to give a layer of thickness of from 1 to 5 mm. In another embodiment of the present invention, another cement-bound mineral coating is applied to this first coating, and the second coating may be a polymer-modified coating of the invention or else a coating without polymer-modification. It is preferable for this second coating again to be a coating modified with the polymer dispersions of the invention. The amount of cement-containing coating material selected for application is generally such as to give the second coating a thickness of from 1 to 15 mm, in particular from 5 to 15 mm.

Unlike other polymer dispersions of the prior art, the polymer dispersions used according to the invention do not retard the setting process. The coatings therefore quickly gain high strength. In addition, paints adhere better to the mineral coating while it is still moist. The polymer dispersions used according to the invention moreover do not stiffen the mineral coating and in some cases their plasticizing action reduces the water/cement figure to values <0.5, in particular <0.45 and particularly preferably <0.4, giving the mineral coating increased final strength.

The concrete moldings and especially the concrete roof tiles provided with a cement-bound, mineral coating of the invention have a particularly smooth surface which has few locations susceptible to erosion or to attack by plant life. The mineral coating of the invention is found not to flake, even under mechanical stress or when exposed to frost.

It has proven advantageous for an additional polymeric coating material, preferably based on an aqueous polymer dispersion, to be applied to the mineral coating of the invention. This polymeric coating may be applied to the cement-bound mineral coating of the invention either prior to or after setting. The polymer-bound coating material is preferably applied prior to the setting of the cement-bound mineral coating of the invention, and the resultant coated concrete roof tile is then passed on to the setting process. The application may take place in a manner known per se, by spraying, troweling, doctor-application, roller-application or casting.

Suitable coating materials are any of the polymer-bound coating materials of the prior art used for coating conventionally manufactured concrete roof tiles. These are particularly coating materials based on aqueous polymer dispersions of the abovementioned polymer classes ii and iii.

The polymers in the coating materials preferably have a glass transition temperature of from −20 to +80° C. and in particular from 0 to +50° C. Their molecular structure is generally comparable with that of the polymers of the invention, but use may be made of other emulsifier systems, for example the mono- and dialkylbisphenyl ether sulfonates mentioned in EP-A 469 295. The polymer dispersions suitable for polymeric coating materials may also use other comonomers, e.g. ethylenically unsaturated silane compounds.

Suitable coating materials described for the coating of conventionally manufactured concrete roof tiles may be found in EP-A 469 295, EP-A 492 210, EP 355 028, EP 383 002, EP-A 941 977, DE-A 197 49 642, DE-A 198 10 050, DE-A 40 03 909 and DE-A 43 41 260. All of the coating materials described in the abovementioned patent applications, and all of the coating processes described therein for conventionally produced concrete roof tiles may be used for the concrete roof tiles provided with a mineral coating. In this respect, the full disclosure of these publications is incorporated herein by way of reference.

When applied to the concrete roof tile provided with a mineral coating of the invention, the polymer-bound coating materials may be either in pigmented form, i.e. in the form of a paint, or else in the form of a pigment-free preparation, i.e. a clear lacquer.

One or more layers of the polymer-bound coating materials may be applied to the concrete roof tile provided with the mineral coating.

In a particularly preferred embodiment of the process of the invention, preferably before the tile has set, the first step is to apply to the concrete roof tile provided with a mineral coating of the invention a pigment-free coating material based on an aqueous polymer dispersion, preferably on a straight acrylate dispersion or on a styrene/acrylate dispersion. A second step applies to the resultant concrete roof tile, provided with a mineral coating and with a polymer-bound coating, another polymer-bound coating material, preferably based on a styrene/acrylate dispersion or on a straight acrylate dispersion. The second coating material generally has the formulation of a paint, i.e. comprises color pigments and, where appropriate, fillers. In paints of this type, the content of pigment plus filler is generally from 5 to 100% by weight, based on the polymer present in the paint. Other pigment-free or pigment-containing coating materials based on aqueous polymer dispersions or on other polymers may be applied to this paint coating. If the second polymer coating embraces two or more different polymeric layers, the first application of the second coating generally comprises more pigment than the other layers subsequently applied.

The selection of the amounts of the individual polymeric coating materials applied is generally such as to give the first coating a weight per unit area of from 50 to 500 g/m$^2$ and the second and further coatings a total weight per unit area of from 50 to 500 g/m$^2$ (calculated as dry weight). The first coating here serves as a primer or as an adhesion promoter for the second and other coatings.

The concrete moldings and the concrete roof tiles of the invention, provided with a mineral coating, have a particularly smooth surface and are therefore relatively resistant to erosion by weathering and to infestation with microorganisms, such as fungi and algae, and also to infestation by lichens and mosses. The additional polymeric coating improves the weathering resistance of the concrete roof tiles, in particular the prevention of calcium efflorescence. Surprisingly, when concrete roof tiles have a polymer-modified mineral coating of the invention, the prevention of efflorescence in these tiles is better than in conventional concrete roof tiles without any mineral coating, and also better than in concrete roof tiles with a mineral coating which is not polymer-bound. In addition, the polymeric coatings have better adhesion to the polymer-modified mineral coatings, and have less tendency to blister. The polymeric coatings on the polymer-modified mineral coatings of the invention are moreover less susceptible to the effects of frost.

The examples below are intended to illustrate the invention, but not to limit the same.

I. Polymer-modified, Cement-bound Mineral Coating Compositions, Coated Precast Concrete Products Produced Therewith, and Performance Testing.

The aqueous polymer dispersions used for modification were D1, D2 and D1 comp.:

D1 (inventive):

The aqueous polymer dispersion D1 used was the aqueous styrene-butadiene polymer dispersion described in Example 1 of WO 98/35995. The polymer in this dispersion has been built up from 65 parts by weight of styrene, 32.5 parts by weight of butadiene and 2.5 parts by weight of N-methylolacrylamide. As stabilizer system, the dispersion comprises 1 part by weight of the sodium salt of the sulfuric half-ester of ethoxylated lauryl alcohol (degree of ethoxylation: 3), 1.8 parts by weight of an ethoxylated isotridecanol with a degree of ethoxylation of 8, and 1.25 parts by weight of a naphthalenesulfonic acid-formaldehyde condensate (Tamol® NN 4501 from BASF Aktiengesellschaft). The dispersion D1 also comprised 0.3% by weight of antifoam based on a mixture made from 40 parts of propoxylated tallow fatty alcohol and from 60 parts of ethylene oxide-propylene oxide block copolymer stearate. Dispersion D1 was prepared by free-radical aqueous emulsion polymerization in the presence of 1.3 parts by weight of tert-dodecyl mercaptan, 1 part by weight of the sodium salt of the sulfuric half-ester of ethoxylated lauryl alcohol, and 0.2 part by weight of the ethoxylated tridecanol. The other constituents of the stabilizer system were added to the aqueous polymer dispersion after polymerization and chemical deodorization. The polymer dispersion had a solids content of 50.4% by weight and a pH of 9.6 (after neutralization with sodium hydroxide solution).

D2 (inventive):

The aqueous polymer dispersion used was a dispersion obtained by emulsion polymerization whose polymer had been built up from 50 parts by weight of n-butyl acrylate, 50 parts by weight of styrene, 1.5 parts by weight of acrylamide and 0.15 part by weight of acrylic acid. As emulsifier system, dispersion D2 comprises 3.5 parts by weight (per 100 parts by weight of polymer) of an ethoxylated nonylphenol (degree of ethoxylation: 25) and 3.5 parts by weight of the sodium salt of the sulfuric half-ester of ethoxylated p-isooctylphenol (degree of ethoxylation: 25).

D1 comp. (not inventive):

The aqueous polymer dispersion D1 comp. used was a dispersion obtained by emulsion polymerization whose polymer had been built up from 50 parts by weight of n-butyl acrylate, 50 parts by weight of styrene, 1.5 parts by weight of acrylamide and 2.5 parts by weight of acrylic acid. As stabilizer system (emulsifier system), the dispersion comprised 0.5 part by weight (per 100 parts by weight of polymer) of an ethoxylated isooctylphenol (degree of ethoxylation: 25) and 1.5 parts by weight of the sodium salt of the sulfuric half-ester of ethoxylated isooctylphenol (degree of ethoxylation: 25).

9.4 parts by weight of polymer dispersion (50% strength by weight), 50 parts by weight of cement (EM I 42.5), 25 parts by weight of quartz sand (from 0.063 to 0.4 mm), 5 parts by weight of iron oxide black pigment, and water to achieve a constant working viscosity, were used to prepare a mineral coating composition. This was applied to a green precast concrete product described below.

A plastic concrete mixture comprising sand (particle size up to 0.3 mm), cement and water in a ratio by weight of 4:1:0.4 was used in extruding a flat band of concrete of thickness about 1.8 cm and width 20 cm, and this was divided into green precast concrete products of length about 30 cm, using a cutting tool. One of the mineral coatings described under I was extruded at a thickness of 3 mm onto these green precast concrete products.

To determine setting performance, flexural strength (to DIN 196 in $N/mm^2$) and compressive strength (to DIN 196 in $N/mm^2$) were determined after one day. The values are given in Table 1. For comparison, an uncoated precast concrete product (Comp. Ex. 3) and a coated precast concrete product whose coating lacked polymer (but otherwise had the same makeup) (Comp. Ex. 1) were tested.

TABLE 1

| Application example | Dispersion | P/C[1] | W/C[2] | Flexural tensile[3] [$N/mm^2$] | Compressive strength[3] [$N/mm^2$] |
|---|---|---|---|---|---|
| Comp. Ex. 1 | — | — | 0.5 | 3.2 | 15.1 |
| Ex. 1 | D1 | 0.094 | 0.45 | 3.2 | 15.1 |
| Ex. 2 | D2 | 0.094 | 0.3 | 3.2 | 13.8 |
| Comp. Ex. 2 | D1 comp. | 0.094 | 0.47 | 3.0 | 11.9 |
| Comp. Ex. 3[4] | — | — | — | 3.6 | 16.1 |

[1]Polymer/cement ratio by weight
[2]Water/cement ratio by weight
[3]Compressive strength and flexural tensile strength after 1 d in dry storage
[4]uncoated precast concrete product Table 1 shows that setting performance is not retarded at all by dispersion D1, and only slightly by dispersion D2. In contrast, D1 comp. markedly retards setting. It was also found that the coating modified with D1 comp. very rapidly became stiff and was difficult to work.

The specimens modified with D1 and the unmodified specimens were also tested for compressive strength after 28 days in dry storage and after 28 days of storage in water. Tensile bond strength (in $N/mm^2$) was also determined on a core (DIN 18555).

TABLE 2

| Precast concrete product | Dispersion | P/C | W/C | Flexural tensile | | Compressive strength | | Tensile bond strength[1] |
|---|---|---|---|---|---|---|---|---|
| | | | | dry | wet | dry | wet | |
| Comp. Ex. 1 | — | — | 0.5 | 4.7 | 6.1 | 23.5 | 31 | 0.5(B)[2] |
| Ex. 1 | D1 | 0.094 | 0.45 | 6.1 | 5.9 | 28.0 | 31 | 0.5 |

[1]14 days of dry storage and then 25 cycles of −15° C./storage in water (frost/thaw test)
[2](B) break-up of surface Table 2 shows that the mineral coatings modified with D1 have higher strength on dry storage and under simulated frost/thaw conditions have better adhesion to the precast concrete product than do unmodified mineral coatings.

II. Production and Testing of Painted Precast Concrete Products

Using a spray gun, a primer based on an aqueous polymer dispersion was applied (at about 150 g/$m^2$) to a portion of the precast concrete products produced as in I and provided with a mineral coating, followed by drying for 2 h at 40° C and 75% relative humidity and then for 4 h at 40° C. and 95% relative humidity. A paint was then applied in the same way (at about 300 g/$m^2$) and dried for 8 h at 40° C. and 50% relative humidity.

The primer used was an aqueous preparation based on a 50% strength by weight polymer dispersion whose polymer contains 54 parts by weight of copolymerized stryene, 44 parts by weight of copolymerized n-butyl acrylate and 2 parts by weight of copolymerized acrylic acid, and 0.5 part by weight of copolymerized methacryloxypropyltrimethoxysilane, the dispersion being stabilized with 0.5 part by weight of sodium lauryl sulfate. To prepare the primer, 50 g of an antifoam (Tegofoamex® 825 from Goldschmidt AG) and 0.5 g of a plasticizer (industrial mixture of di-n-butyl esters of $C_4$–$C_6$ dicarboxylic acids were added to 1 kg of this dispersion, followed by dilution with 1 kg of deionized water.

The paint used was a pigmented, polymer-bound preparation based on the aqueous polymer dispersion described for the primer. To prepare the paint, 230.6 g of a commercially available filler (calcium carbonate/calcium silicate) and 82.6 g of iron oxide red pigment from Bayer AG were suspended in 112 g of water. To this were added, with stirring, 421.5 g of the polymer dispersion prepared with an antifoam and with a plasticizer, but not as yet diluted. The paint was allowed to age for 48 h at room temperature before use. It had a pigment volume concentration of 42.

For comparative purposes, a conventional precast concrete product without any mineral coating was produced and coated in the manner described above with primer and paint.

In addition, a precast concrete product was produced and provided with a mineral coating not modified with polymer.

III. Testing of Weathering Properties:

1) Determination of Extent of Prevention of Efflorescence from Mineral Moldings

For this, a product produced as in II was placed with its face side on a waterbath heated to 60° C. The degree of efflorescence was assessed visually. The assessment was based on the grading scale below. The results are given in Table 2.

0=no efflorescence
1=hardly any efflorescence
2=slight efflorescence
3=moderate efflorescence
4=marked efflorescence
5=very marked efflorescence 2) Determination of Adhesion of Coating on Simulated Wet Weathering A precast concrete product produced as in II was treated as described under III 1) with steam for 7 d. The adhesion of the coating was then assessed in the regions which had been exposed to the steam. For this, a strip of adhesive tape (TESA™ from Beiersdorf AG) 10 cm in length and 3 cm in width was applied to the coating under slight pressure, using a rubber roller. After about 2 min, the adhesive tape strip was abruptly removed. The amount of materials adhering to the adhesive tape was evaluated visually. The results are given in Table 2. The evaluation was based on the following grading scale:

0=none
1=barely discernible
2=discernible
3=significant
4=very significant
5=extremely significant 3) Determination of Resistance to Frost/Thaw Frost/thaw resistance was determined by subjecting the coated precast concrete products to the following test cycle for 5 days: 5 h of storage at 20° C. in water –5 h of storage at –20° C. The test specimens were then stored for a week at 70° C. This constitutes a cycle. The damage to the coating (separation, adhesion, gloss) was then classified visually using the scale below:

1=barely discernible
2=easily discernible
3=significant
4=very significant
5=extremely significant The results in Table 2 were determined after 5 cycles.

4) Determination of Blistering Tendency

The test products which have already been assessed in 1. are also used to determine blistering tendency. For this, blistering tendency is determined visually on what are called here exposed regions (see above). The results are given in Table 2, and are based on the following grading scale:

0=none
1=barely discernible
2=easily discernible
3=significant
4=very significant
5=extremely significant

TABLE 3

| Product No.[1] | 1 comp. | 2 comp. | 1 | 2 |
|---|---|---|---|---|
| Efflorescence | 2 | 2 | 1 | 1 |
| Adhesion | 2 | 2 | 0 | 0 |
| Frost/thaw | 3 | 4 | 2 | 2 |
| Blistering | 1 | 1 | 1 | 1 |

[1] 1 comp.: precast concrete product without mineral coating
2 comp.: precast concrete product with unmodified mineral coating
1: precast concrete product with mineral coating modified with D1
2: precast concrete product with mineral coating modified with D2

We claim:

1. A method of coating a concrete molding which comprises:
   a) applying at least one plastic, cement-bound mineral composition to an uncoated concrete molding, wherein said plastic composition comprises sand, cement, at least one aqueous polymer dispersion and water in amounts ensuring that said plastic composition has plastic deformability, and
wherein the aqueous polymer dispersion comprises:
   A at least one polymer P in the form of dispersed polymer particles having a glass transition temperature within the range from –20 to +80° C., the polymer having been prepared from ethylenically unsaturated monomers M, comprising:
      i) from 90 to 99.9% by weight of at least one hydrophobic, monoethylenically unsaturated monomer M1, selected from the group consisting of styrene, butadiene, the $C_1$–$C_4$-alkyl esters of methacrylic acid and the $C_2$–$C_{12}$-alkyl esters of acrylic acid, and
      ii) from 0.1 to 10% by weight of at least one hydrophilic, monoethylenically unsaturated monomer M2 comprising up to 2% by weight, based on the total amount of monomer, of one or more monoethylenically unsaturated monomers having at least one acid group (monomers M2a), and/or embracing up to 10% by weight of other hydrophilic monomers M2b, and
   B at least one emulsifier system for stabilizing the polymer particles comprising:
      a) at least one salt of a sulfuric half-ester of an alkoxylated alcohol which has at least one $C_4$–$C_{20}$-alkyl chain (salt a), and
      b) at least one alkoxylated alcohol which has at least one $C_4$–$C_{20}$-alkyl chain (neutral compound b).

2. The method as claimed in claim 1, wherein salt a is selected from the group consisting of sodium salts of sulfuric half-esters of ethoxylated $C_8$–$C_{16}$ alkanols with an average degree of ethoxylation of from 2 to 50.

3. The method as claimed in claim 1, wherein the neutral compound b is selected from the group consisting of ethoxylated $C_8$–$C_{16}$ alkanols with an average degree of ethoxylation of from 5 to 60.

4. The method as claimed in claim 1, wherein the emulsifier system further comprises a salt of a formaldehyde condensation product of an aromatic sulfonic acid, and the salt of a formaldehyde condensation product of an aromatic sulfonic acid has a number-average molecular weight <1500.

5. The method as claimed in claim 1, wherein no water-soluble polymer having a number-average molecular weight >1500 is present in the aqueous polymer dispersion.

6. The method as claimed in claim 1, wherein the aqueous polymer dispersion is free from ammonia.

7. The method as claimed in claim 1, wherein the monomer M1 comprises styrene and butadiene in a ratio by weight of from 3:1 to 3:2.

8. The method as claimed in claim 1, wherein the polymer P comprises, as monomer M1,
- at least one copolymerized monomer M1a selected from the group consisting of styrene and methyl methacrylate, and
- at least one copolymerized monomer M1b selected from the group consisting of ethyl acrylate, n-butyl acrylate and 2-ethylhexyl acrylate, where the ratio M1a:M1b by weight is from 2:1 to 1:2.

9. The method as claimed in claim 1, wherein the monomers M2a are selected from the group consisting of monoethylenically unsaturated monocarboxylic acids having from 3 to 6 carbon atoms.

10. The method as claimed in claim 1, wherein the monomers M2b are selected from the group consisting of α,β-monoethylenically unsaturated nitriles having from 3 to 6 carbon atoms, and the amides and the N-methylolamides of monoethylenically unsaturated carboxylic acids.

11. The method as claimed in claim 1, wherein the concrete molding is a concrete roof tile.

12. The method as claimed in claim 11, wherein the concrete roof tile is a green concrete roof tile which is moist.

13. The method as claimed in claim 1, wherein the sand has a particles size of up to 2 mm.

14. The method as claimed in claim 1, wherein the plastic cement-bound mineral composition comprises 30 to 60% by weight of Portland cement, 35 to 60% by weight of sand, 2 to 10% by weight of pigments, and 0 to 3% of auxiliaries (based on the weight of the dry constituents).

15. The method as claimed in claim 1, wherein the plastic cement-bound mineral composition is applied at sufficient thickness to provide a mineral coating, after drying said plastic cement-bound mineral composition having a thickness of from 0.5 to 15 mm.

16. The method as claimed in claim 1, wherein said applying is by spraying, troweling, doctor-application, roller-application, or casting.

* * * * *